United States Patent
Tan et al.

(10) Patent No.: US 12,541,318 B2
(45) Date of Patent: Feb. 3, 2026

(54) METHOD AND DEVICE FOR ACCESSING DATA IN HOST MEMORY

(71) Applicant: Samsung Electronics Co., Ltd., Suwon-si (KR)

(72) Inventors: Ran Tan, Shaanxi (CN); Bumjun Kim, Suwon-si (KR); Jungsoo Kim, Suwon-si (KR); Ning Li, Shaanxi (CN); Ruixiang Lu, Shaanxi (CN); Nannan Zhang, Shaanxi (CN); Heng Liu, Shaanxi (CN)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 18/437,583

(22) Filed: Feb. 9, 2024

(65) Prior Publication Data

US 2025/0077107 A1  Mar. 6, 2025

(30) Foreign Application Priority Data

Aug. 29, 2023  (CN) .......................... 202311101921.2

(51) Int. Cl.
*G06F 3/06* (2006.01)

(52) U.S. Cl.
CPC .......... *G06F 3/0652* (2013.01); *G06F 3/0611* (2013.01); *G06F 3/0659* (2013.01); *G06F 3/0673* (2013.01)

(58) Field of Classification Search
CPC .... G06F 3/0652; G06F 3/0611; G06F 3/0659; G06F 3/0673; G06F 9/5016;

(Continued)

(56) References Cited

U.S. PATENT DOCUMENTS

| | | | |
|---|---|---|---|
| 8,601,201 B2 | 12/2013 | Scannell et al. | |
| 2012/0117298 A1* | 5/2012 | Scannell | ............ G06F 9/45558 |
| | | | 711/6 |

(Continued)

FOREIGN PATENT DOCUMENTS

| | | |
|---|---|---|
| CN | 113297224 A | 8/2021 |
| CN | 114020655 A | 2/2022 |

(Continued)

OTHER PUBLICATIONS

Maruf, et al. "Memtrade: Marketplace for Disaggregated Memory Clouds," The Association Computing Machinery, Proc. ACM Meas. Anal. Comput. Syst., vol. 7, No. 2, Article 41, pp. 41:1-41:27 (2023).

(Continued)

*Primary Examiner* — Michael Krofcheck
(74) *Attorney, Agent, or Firm* — Harness, Dickey & Pierce, P.L.C.

(57) ABSTRACT

A method and device for accessing data in a host memory are provided. The method includes: in response to writing first data corresponding to a first Remote Dictionary Server (Redis) instance of a plurality of Redis instances into the host memory, determining whether a remaining host memory capacity for the first Redis instance is sufficient to store the first data, wherein the remaining host memory capacity is based on a difference between maximum capacity of the host memory that is capable of being used by the first Redis and capacity of the host memory that has been used by the first Redis instance; and in response to determining that that the remaining host memory capacity is not sufficient to store the first data, evicting second data of the first Redis instance from the host memory to a Computing Express Link (CXL) device and storing the first data in the host memory.

20 Claims, 7 Drawing Sheets

(58) Field of Classification Search
CPC .............. G06F 16/24552; G06F 16/25; G06F 13/1668; G06F 13/4221; G06F 16/2228; G06F 16/24539
See application file for complete search history.

(56) References Cited

U.S. PATENT DOCUMENTS

| | | | |
|---|---|---|---|
| 2021/0073151 A1* | 3/2021 | Sen .................... | G06F 12/0837 |
| 2022/0147455 A1* | 5/2022 | Branover ............ | G06F 13/1668 |
| 2022/0188228 A1 | 6/2022 | Trika et al. | |
| 2022/0224776 A1 | 7/2022 | Doshi et al. | |
| 2023/0222067 A1 | 7/2023 | Ji | |
| 2023/0379682 A1* | 11/2023 | Chen ................. | H04W 28/0862 |
| 2024/0340467 A1* | 10/2024 | Newton ........... | H04N 21/23106 |

FOREIGN PATENT DOCUMENTS

| | | |
|---|---|---|
| CN | 114115699 A | 3/2022 |
| CN | 114116711 A | 3/2022 |
| CN | 114490761 A | 5/2022 |
| CN | 114546274 A | 5/2022 |
| CN | 114879906 A | 8/2022 |

OTHER PUBLICATIONS

Sai Sha, et al. "vTMM: Tiered Memory Management for Virtual Machines," EuroSys '23, pp. 1-15 (2023).
Yan Sun, et al. "Demystifying CXL Memory with Genuine CXL-Ready Systems and Devices," IEEE/ACM International Symposium on Miroarchitecture, pp. 1-12 (2023).

* cited by examiner

METHOD AND DEVICE FOR ACCESSING DATA IN HOST MEMORY

CROSS-REFERENCE TO RELATED APPLICATIONS

This application is based on and claims priority under 35 U.S.C. § 119 to Chinese Patent Application No. 202311101921.2, filed on Aug. 29, 2023, in the China National Intellectual Property Administration, the disclosure of which is incorporated by reference herein in its entirety.

BACKGROUND

The present disclosure relates to a technical field for data accessing, and more specifically, to a method and device for accessing data in a host memory.

A Remote Dictionary Server (Redis), which is a kind of memory database that stores data in a data form of a Key-Value (KV) pair with a data structure of a dictionary, is now widely used in various fields due to a fast speed of reading and writing of the memory database. Data in a Redis database is stored in a host memory to achieve fast access to the data of the Redis database. However, host memory resources are limited, and thus a size of the host memory may limit capacity of the Redis database.

For example, in a scenario for multiple Redis instances, a plurality of Redis instances may be started on a single server, and each Redis instance may be configured with a corresponding maximum available memory of the server. As an amount of data of a certain Redis instance increases, the maximum available memory for the certain Redis instance needs to be expanded. If physical capacity of the server is insufficient, memory capacity of the Redis database needs to be expanded.

Two main ways to expand memory capacity of the Redis database include scaling up and scaling out.

For example, there may be a scaling up. When the amount of data of the Redis instances reaches the maximum available memory capacity of a Redis server node, the memory capacity of the server node may be expanded by adding a memory or a cache to the Redis server node. However, this approach requires the server to be shut down when expanding the capacity of the memory, which may affect service of the Redis database.

Generally, memory devices meeting a requirement for peak data may also be pre-configured on a Redis server when the Redis server is built. However, this approach may lead to wasting of memory resources when the amount of data does not reach a peak.

An SSD and a persistent memory may be used to extend the capacity of the memory. However, this approach may not be suitable when accessing for objects of a dataset are completely random, when an average size of keys in the dataset is approximately the same size as an average size of values in the dataset, and/or when a size of the dataset is small and there is a requirement for extremely high throughput. In addition, compared to data being stored in a host memory (e.g., a DRAM), the data being stored on a flash device may result in an exponential increase in latency for data accessing.

Alternatively or additionally, there may be a scaling out. A cluster of nodes may be formed by a plurality of Redis nodes each of which corresponds to a plurality of slots. When user data is stored, keys of the user data are mapped to a slot and the data is then cached on a Redis node corresponding to the slot. However, when the number of Redis instances is increased or decreased, the Redis nodes need to be adjusted, thereby resulting in a migration of a large amount of data. In addition, if an issue occurs on the data in the cluster, it is necessary for operations and maintenance staff to work with developers, which may lead to a higher operation and maintenance cost. In addition, multiple sets of routing sharding logic need to be written and maintained for different client programs. As used herein, sharding is a type of database partitioning that separates large databases into smaller, faster, more easily managed parts.

SUMMARY

Reducing data access latency and/or operation and maintenance costs, and/or improve an effective utilization of a memory device while expanding the memory capacity of the Redis system are important issues to be addressed or at least partially addressed.

Various example embodiments provide a method and/or device for accessing data in a host memory, which are capable of improvement, e.g., by reducing data access latency and/or operation and maintenance costs. Alternatively or additionally, some example embodiments may improve an effective utilization of a memory device while expanding the memory capacity of the Redis system.

According to some example embodiments, there is provided a method for accessing of data in a host memory, including: in response to writing first data corresponding to a first Redis instance of a plurality of Redis instances into the host memory, determining whether a remaining host memory capacity for the first Redis instance is sufficient to store the first data, wherein the remaining host memory capacity is based on a difference between maximum capacity of the host memory that is capable of being used by the first Redis and capacity of the host memory that has been used by the first Redis instance; and in response to the remaining host memory capacity not being sufficient to store the first data, evicting second data of the first Redis instance from the host memory to a Computing Express Link (CXL) device and storing the first data in the host memory.

Alternatively or additionally according to some example embodiments, there is provided a device for accessing of data in a host memory, including: a first determining unit configured to determine whether remaining host memory capacity of a first Redis instance of a plurality of Redis instances is sufficient to store first data corresponding to the first Redis instance in response to writing the first data into the host memory, wherein the remaining host memory capacity is based on a difference between maximum capacity of the host memory that is capable of being used by the first Redis and capacity of the host memory that has been used by the first Redis instance; an evicting and storing unit configured to evict second data of the first Redis instance from the host memory to a Computing Express Link (CXL) device and store the first data in the host memory in response to the remaining host memory capacity not being sufficient to store the first data.

BRIEF DESCRIPTION OF DRAWINGS

The above and other purposes and features will become more apparent through the following descriptions made in conjunction with the figures schematically illustrating various example embodiments, in which.

DETAILED DESCRIPTION

Figure 1:
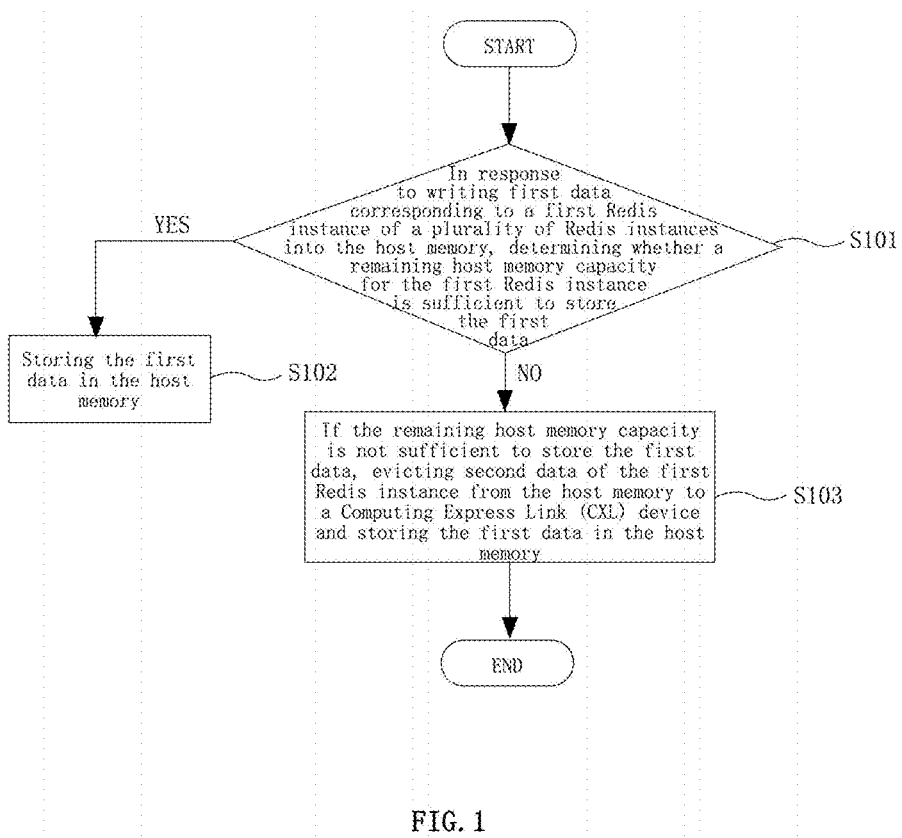
FIG. 1 illustrates a flowchart of a method for accessing data in a host memory according to some example embodiments.

Hereinafter, various example embodiments are described with reference to the accompanying drawings, in which like reference numerals are used to depict the same or similar elements, features, and structures. However, the present disclosure is not intended to be limited by the various embodiments described herein to a specific embodiment and it is intended that the present disclosure covers all modifications, equivalents, and/or alternatives of the present disclosure, provided they come within the scope of the appended claims and their equivalents. The terms and words used in the following description and claims are not limited to their dictionary meanings, but are merely used to enable a clear and consistent understanding of the present disclosure. Accordingly, it should be apparent to those of ordinary skill in the art that the following description of various embodiments of the present disclosure is provided for illustration purpose only and not for the purpose of limiting the present disclosure as defined by the appended claims and their equivalents.

It is to be understood that the singular forms include plural forms, unless the context clearly dictates otherwise. The terms "include," "include," and "have", used herein, indicate disclosed functions, operations, or the existence of elements, but does not exclude other functions, operations, or elements.

For example, the expressions "A or B," or "at least one of A and/or B" may indicate A and B, A, or B. For instance, the expression "A or B" or "at least one of A and/or B" may indicate (1) A, (2) B, or (3) both A and B.

In various example embodiments, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the present disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are to describe certain embodiments of the present disclosure, but are not intended to limit the scope of other embodiments. Unless otherwise indicated herein, all terms used herein, including technical or scientific terms, may have the same meanings that are generally understood by a person of ordinary skill in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding embodiments of the present disclosure.

The CXL protocol is executed on a PCIe Gen5 physical layer and is a cache coherency interconnection protocol. For example, the CXL 2.0 supports hot plug and resource pooling. The CXL protocol maintains coherency memory space between a CPU and a device, and thus may allow the CPU to randomly access a memory of a CXL device in a way of addressing per byte.

According to various example embodiments, a pool of CXL memory resources may be configured based on characteristics of the CXL device to use the CXL device as an extension of a host memory.

FIG. 1 illustrates a flowchart of a method for accessing data in a host memory according to embodiments of the present disclosure.

Referring to FIG. 1, at operation S101, whether a remaining host memory capacity for a first Redis instance of a plurality of Redis instances is sufficient to store first data corresponding to the first Redis instance is determined in response to writing the first data into the host memory. The remaining host memory capacity is based on or indicates a difference between the maximum capacity of the host memory that is capable of being used by the first Redis and capacity of the host memory that has been used by the first Redis instance. It should be understood by those of ordinary skill in the art that the Redis is a key-value pair (Key-Value) database based on memory storage, which may be run based on memory, may support distributed deployment and thus is infinitely scalable theoretically. In addition, the Redis may support a variety of types of data structures, and may provide a variety of language Application Programming Interface (API). Accordingly, the Redis may be used or widely used for one or more of caching systems (which are used for caching "hot" data), counters, message queuing systems, leaderboards, social networks, and real-time systems.

A Redis instance represents a standalone Redis service application. Multiple Redis instances may indicate that the multiple Redis services may run on a single machine, and the multiple Redis instances do not affect each other or minimally affect one another. Multiple Redis instances may be used to provide different configurations of services to different users, and may also be used to increase concurrency of Redis services.

As an example, a host as described herein may refer to an electronic device such as a server and/or a computer and an example of the host is not limited thereto.

In some example embodiments, the host memory may be or may include or be included in a Dynamic Random Access Memory (DRAM).

According to various example embodiments, a Redis instance herein may indicate a Redis application (APP).

As an example, each of a plurality of Redis instances has a corresponding maximum capacity of the host memory that is capable of being used by the each Redis instance.

For example, a Redis server (or a host) may deploy a plurality of Redis instances and configure the corresponding maximum capacity for each of the plurality of Redis instances.

As an example, different Redis instances may be configured with the same or with different maximum capacity.

At operation S102, if or in response to the remaining host memory capacity being sufficient to store the first data, the first data is stored into the host memory.

At operation S103, if or in response to the remaining host memory capacity not being sufficient to store the first data, second data of the first Redis instance is evicted from the host memory to a CXL device and then the first data is stored in the host memory.

It should be understood by those of ordinary skill in the art that storage space of the CXL device is capable of being accessed randomly in a way of addressing per byte, so that the CXL device may be accessed quickly by the host.

For example, when the data of a certain Redis instance needs to be written to the host memory, if the remaining host memory capacity for the certain Redis instance is less than the size of the data, a part of old data (e.g., data that has been stored for a longer period of time) of the certain Redis in the host memory may firstly be evicted to the CXL device, and then the data may be stored in the host memory so that capacity of the host memory actually used by the certain Redis instance is not greater than maximum capacity of the host memory that is capable of being used by the certain Redis instance.

As an example, the evicting of the second data of the first Redis instance from the host memory to the CXL device includes: requesting for storage space from the CXL device; storing the second data in the requested storage space; storing Key-Value (KV) information corresponding to the second data in a CXL device dictionary (DICT) corresponding to the first Redis instance; deleting the second data from the host memory; and deleting the KV information corresponding to the second data from the host memory DICT corresponding to the first Redis instance.

As an example, the second data is data whose heat satisfies a predetermined condition of the first Redis instance in the host memory.

As an example, the second data may be old data, data that has been stored for a longer period of time or data whose storing length of time is beyond a length of time such as a dynamically determined or predetermined length of time. It should be understood by those of ordinary skill in the art that conditions may be dynamically determined or predetermined, and the condition is not limited thereto.

As an example, the CXL device is shared by a plurality of Redis instances.

Figure 2:
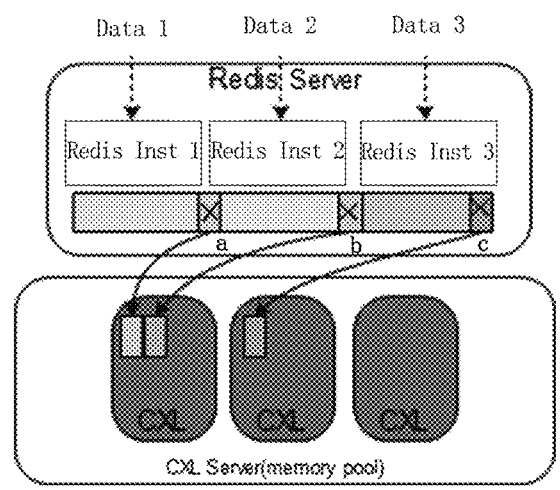
FIG. 2 illustrates a schematic diagram of an example of evicting data that has been stored for a longer period of time from a memory of a Redis server according to some example embodiments.

FIG. 2 illustrates a schematic diagram of an example of evicting old data (e.g., data that has been stored for a longer period of time) from a memory of a Redis server, according to various example embodiments.

Referring to FIG. 2, the Redis server may access a CXL memory resource pool (which may be referred to hereinafter as a resource pool and/or a memory pool) in the CXL server via a CXL switch.

It should be understood by those of ordinary skill in the art that while FIG. 2 illustrates that the Redis server and the CXL resource pool are deployed on different servers, the Redis server and the CXL memory pool may be deployed on the same server.

Referring to FIG. 2, when data (e.g., data 1, data 2 or data 3) of a Redis instance (e.g., instance 1, instance 2 or instance 3) needs to be or is expected to be written to the memory of the Redis server, if remaining memory capacity for the Redis instance (e.g., a difference between the maximum memory capacity of the memory of the Redis server that is capable of being used by the Redis instance and the capacity of the memory of the Redis server that has been used by the Redis instance) is not sufficient to store the data, a part of old data of the Redis instance (e.g., old data such as one or more of a, b, or c) is evicted to the memory pool in the CXL server. After evicting the part of the old data, the data is written to the memory of the Redis server.

As an example, different storage areas of the memory of the Redis server may be allocated to different Redis instances as memory space of the Redis server that is capable of being used by the Redis instances, such that the maximum capacity of the memory of the Redis server that is capable of being used by a Redis instance is the capacity of the storage area corresponding to the Redis instance of the memory of the Redis server.

As an example, when a part of old data in the memory of the Redis server needs to be or is expected to be evicted, storage space may first be requested from the memory pool in the CXL server, then the part of the old data is stored in the requested storage space and the part of the old data in the memory of the Redis server is deleted.

As an example, two dictionaries, i.e., a host (e.g., a Redis server) memory dictionary (DICT) and a CXL device dictionary, may be maintained for each Redis instance. The host memory dictionary and the CXL device dictionary correspond to a space for keys stored in the host memory (e.g., the memory of the Redis server) and a space for keys stored in the CXL device respectively. In addition, an evicting policy may be maintained for each Redis instance to evict a part of old data corresponding to the each Redis instance to the CXL device.

For example, when data a needs to be or is expected to be evicted to the resource pool of the CXL server, Key-Value (KV) information corresponding to the data a in a dictionary corresponding to the memory of the Redis server may be deleted and the Key-Value (KV) information corresponding to the data a is stored in a dictionary corresponding to the CXL server.

As can be seen from FIG. 2, the CXL device may be shared by a plurality of Redis instances, and thus a storage resource utilization for the CXL device may be increased.

By sharing the CXL resource pool, extended memory resources are dynamically allocated according to service and do not need to be bound to Redis instances, and thus the operation and maintenance cost is reduced.

In addition, due to a hot plug characteristic of a CXL device, the CXL device may be configured online on the server, and thus dynamic allocation of extended memory resources based on service throughput is achieved.

As data in the CXL server increases, the remaining storage capacity of the CXL server gradually decreases. In order to be able to store the data evicted from the Redis server, it should be ensured that the CXL server has a certain size of remaining storage capacity.

As an example, the method further includes determining whether the remaining storage capacity of the CXL device is less than a first threshold value; and deleting or evicting a part of data in the CXL device such that the remaining storage capacity of the CXL device is not less than the first threshold, when the method determines that the remaining storage capacity of the CXL device is less than the first threshold.

In some example embodiments, time for objects in the CXL resource pool may be maintained based on a time list to store new data at a head of the resource pool and old data at a tail of the resource pool.

In some example embodiments, usage of the CXL resource pool may be monitored and when remaining capacity of the resource pool is less than the first threshold, a part of old data in the resource pool may be evicted or deleted.

In some example embodiments, the deleting of the part of the data in the CXL device includes deleting data that has been stored for a longer period of time in storage space of the CXL device such that the remaining storage capacity of the CXL device is greater than a second threshold value; deleting Key-Value (KV) information of the data that has been stored for the longer period of time in a CXL device dictionary (DICT) corresponding to the first Redis instance; and updating information on the remaining storage capacity of the CXL device.

Figure 3:
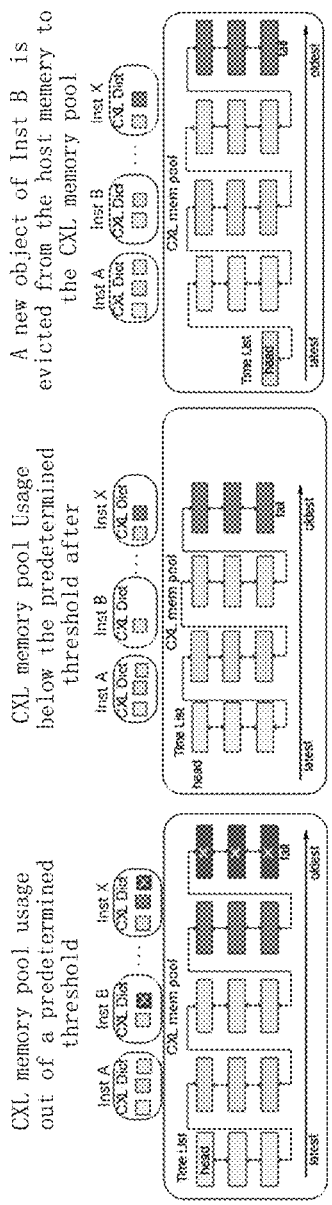
FIG. 3 illustrates a schematic diagram of an example of evicting data from a Computing Express Link (CXL) resource pool.

FIG. 3 illustrates a schematic diagram of an example of deleting data in a CXL resource pool (e.g., CXL memory pool).

Referring to (a) of FIG. 3, when an amount of data in the CXL resource pool exceeds a predetermined threshold, a part of old data in the resource pool (e.g., data at the tail) needs to be deleted and CXL memory space corresponding to the part of the old data is released.

In some example embodiments, KV information corresponding to the part of the old data in a CXL device dictionary for a Redis instance corresponding to the part of the old data may also be deleted.

In some example embodiments, information on remaining storage capacity of the CXL resource pool may be updated after the part of the old data is deleted.

In some example embodiments, if the remaining storage capacity of the CXL resource pool is still less than the first threshold after the part of the old data is deleted, deleting of a part of old data in the CXL resource pool may be continued.

The (b) of FIG. 3 illustrates data in the CXL resource pool after deleting (or evicting) the part of the old data.

Referring to (c) of FIG. 3, the data evicted from the host memory may be stored to the head of the CXL resource pool.

Referring back to FIG. 1, at operation S104, in response to reading third data corresponding to the first Redis instance, the third data is read from the CXL device if or in response to the third data not hit in the host memory.

In some example embodiments, when data corresponding to a Redis instance is accessed, the data may firstly be queried in a host memory dictionary corresponding to the Redis instance, and if the data is hit in the host memory dictionary, the data is read from the host memory. If the data is not hit in the host memory dictionary, the data is queried from a CXL device dictionary corresponding to the Redis instance. If the data is hit in the CXL device dictionary, the data may be read from the CXL device, the data is transferred from the CXL device to the host memory and the data may be deleted from the CXL device. If the data is not hit, the data is obtained from other storage device of the Redis database and the obtained data is migrated to the host memory.

Example embodiments use a two-level cache architecture in which hot data and cold data are separated, the hot data is stored in the host memory and the warm data stored in the CXL device. There is no increase in accessing latency for the Redis database for the same capacity host memory configuration.

The methods for accessing data in a host memory according to various example embodiments are described above with reference to FIGS. 1 to 3, and a device for accessing data in a host memory, an electronic device, a storage device, and a system according to various example embodiments are described below with reference to FIGS. 4 to 8.

Figure 4:
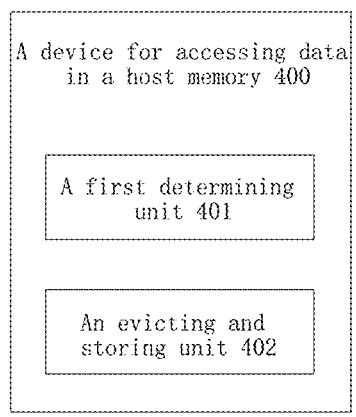
FIG. 4 illustrates a block diagram of a structure of a device for accessing data in a host memory according to some example embodiments.

FIG. 4 illustrates a block diagram of a device for accessing data in a host memory 400, according to some example embodiments.

Referring to FIG. 4, the device for accessing the data in the host memory 400 may include a first determining unit 401 and an evicting and storing unit 402. It should be understood by those of ordinary skill in the art that the device for accessing the data in the host memory 400 may additionally include other components, and that at least one of components included in the device for accessing the data in the host memory 400 may be combined or be further divided.

In some example embodiments, the first determining unit 401 may be configured to determine whether remaining host memory capacity of a first Redis instance of a plurality of Redis instances is sufficient to store first data corresponding to the first Redis instance in response to writing the first data into the host memory, wherein the remaining host memory capacity indicates a difference between maximum capacity of the host memory that is capable of being used by the first Redis and capacity of the host memory that has been used by the first Redis instance.

In some example embodiments, the evicting and storing unit 402 may be configured to evict second data of the first Redis instance from the host memory to a Computing Express Link (CXL) device and store the first data in the host memory if the remaining host memory capacity is not sufficient to store the first data.

In some example embodiments, the CXL device is shared by the plurality of Redis instances.

In some example embodiments, the second data is data whose heat meets a predetermined condition of the first Redis instance in host memory.

In some example embodiments, the device for accessing the data in the host memory 400 may further include a reading unit (not shown) configured to read third data from the CXL device if the third data is not hit in the host memory, in response to reading the third data corresponding to the first Redis instance.

In some example embodiments, the evicting and storing unit 402 may be configured to request storage space from the CXL device store the second data in the requested storage space store Key-Value (KV) information corresponding to the second data in the CXL device dictionary (DICT) corresponding to the first Redis instance, delete the second data from the host memory and delete the KV information corresponding to the second data from the host memory DICT corresponding to the first Redis instance.

In some example embodiments, the device for accessing the data in the host memory 400 may further include a second determining unit (not shown) configured to determine whether remaining storage capacity of the CXL device is less than a first threshold value, and a deleting unit (not shown) configured to delete a part of data in the CXL device such that the remaining storage capacity of the CXL device is not less than the first threshold when it is determined that the remaining storage capacity of the CXL device is less than the first threshold.

In some example embodiments, the deleting unit may be configured to delete data in storage space of the CXL device that has been stored for a longer period of time so that the remaining storage capacity of the CXL device is greater than a second threshold value, delete Key-Value (KV) information of the data that has been stored for the longer period of time in the CXL device dictionary (DICT) corresponding to the first Redis instance, and update information on the remaining storage capacity of the CXL device.

According to various example embodiments, there is provided a computer readable storage medium storing a computer program that when executed by a processor causes the processor to implement the method for accessing the data in the host memory as described herein.

Figure 5:
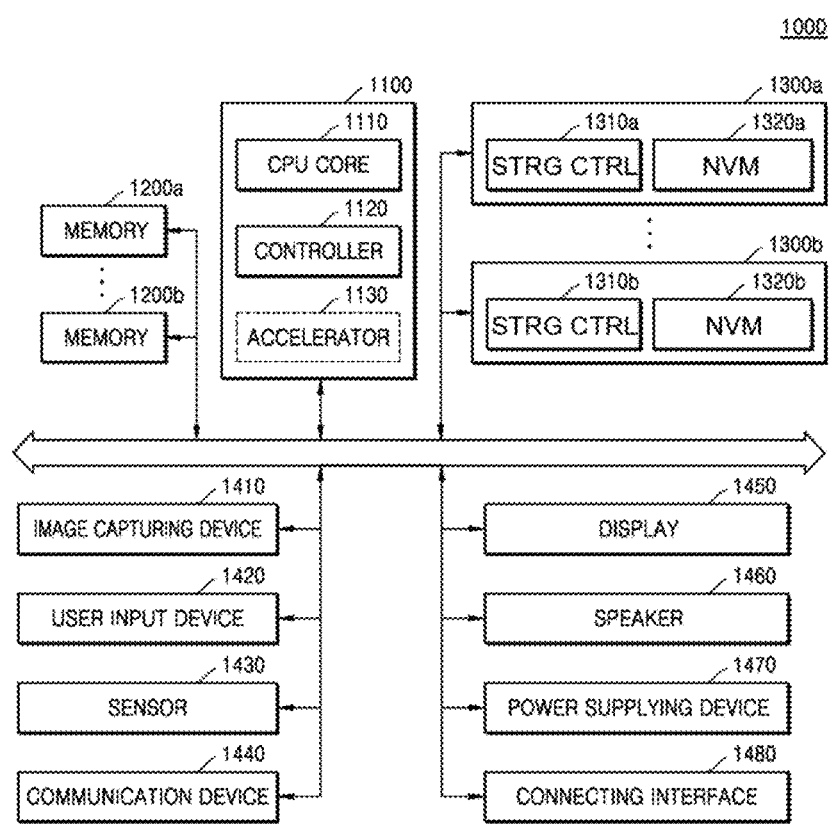
FIG. 5 is a schematic diagram of an electronic device according to some example embodiments.

FIG. 5 is a schematic diagram of an electronic device 1000, according to some example embodiments.

The electronic device 1000 of FIG. 5 may basically be or include, or be included in, a mobile system, such as one or more of a portable communication terminal (e.g., a mobile phone), a smartphone, a tablet personal computer (PC), a wearable device, a healthcare device, or an Internet of things (IoT) device. However, the electronic device 1000 of FIG. 5 is not necessarily limited to the mobile system and may be, include, or be included in one or more of a PC, a laptop computer, a server, a media player, or an automotive device (e.g., a navigation device).

Referring to FIG. 5, the electronic device 1000 may include a main processor 1100, memories (e.g., 1200a and 1200b), and storage devices (e.g., 1300a and 1300b). In addition, the electronic device 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the electronic device 1000, more specifically, operations of other components included in the electronic device 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include one or more of a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the electronic device 1000. Although each of or either the memories 1200a and 1200b may include a volatile memory, such as static random access memory (SRAM) and/or dynamic RAM (DRAM), each of or either of the memories 1200a and 1200b may alternatively or additionally include non-volatile memory, such as a flash memory, stage-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory) s 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the electronic device 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the electronic device 1000 and include a touch pad, a keypad, a keyboard, a mouse, and/or a microphone.

The sensor 1430 may detect various types of physical quantities, which may be obtained from the outside of the electronic device 1000, and convert the detected physical quantities into electric signals. The sensor 1430 may include one or more of a temperature sensor, a pressure sensor, an illuminance sensor, a position sensor, an acceleration sensor, a biosensor, and/or a gyroscope sensor.

The communication device 1440 may transmit and/or receive signals between other devices outside the electronic device 1000 according to various communication protocols. The communication device 1440 may include one or more of an antenna, a transceiver, and/or a modem.

The display 1450 and the speaker 1460 may serve as output devices configured to respectively output visual information and auditory information to the user of the electronic device 1000.

The power supplying device 1470 may appropriately convert power supplied from a battery (not shown) embedded in the electronic device 1000 and/or an external power source, and supply the converted power to each of components of the electronic device 1000.

The connecting interface 1480 may provide connection between the electronic device 1000 and an external device, which is connected to the electronic device 1000 and capable of transmitting and receiving data to and from the electronic device 1000. The connecting interface 1480 may be implemented by using various interface schemes, such as one or more of advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to various example embodiments, there is provided an electronic device, including: a memory (for example, memories 1200a and 1200b of FIG. 5) storing one or more instructions; and storage devices (for example, storage devices 1300a and 1300b of FIG. 5); and a main processor (for example, main processor 1100 of FIG. 5) configured to execute the one or more instructions to cause the host processor to perform the data compaction method performed by the electronic device as described above and to cause the storage devices to perform the method for accessing the data in the host memory as described herein.

Figure 6:
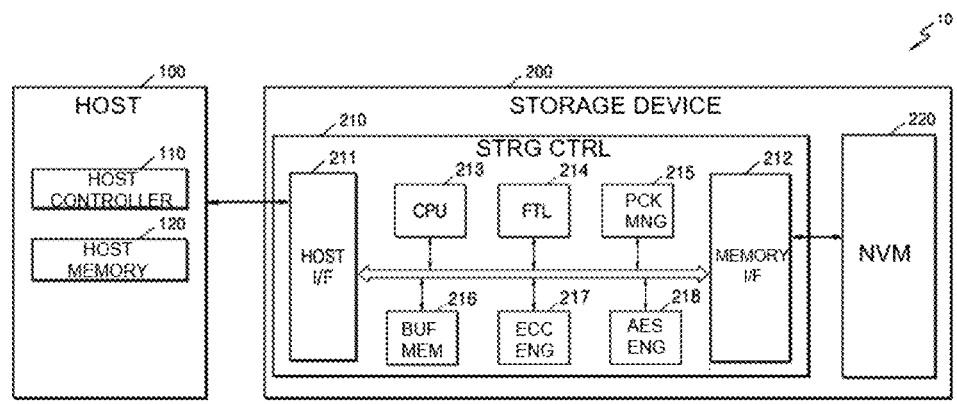
FIG. 6 is a block diagram of a host storage system according to some example embodiments.

FIG. 6 is a block diagram of a host storage system 10, according to some example embodiments.

The host storage system 10 may include a host 100 and a storage device 200. Further, the storage device 200 may include a storage controller 210 and an NVM 220. According to various example embodiments, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array and/or a 3D (or vertical) NAND (VNAND) memory array. Alternatively or additionally, the storage device 200 may include various other kinds of NVMs. For example, the storage device 200 may include one or more of magnetic RAM (MRAM), spin-transfer torque MRAM, conductive bridging RAM (CBRAM), ferroelectric RAM (FRAM), PRAM, RRAM, and various other kinds of memories.

According to various example embodiments, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory (not shown) in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances or at least partly balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

According to some example embodiments, a host storage system is provided, including: a host (for example, host 100 of FIG. 6) including a host memory (for example, host memory 110 of FIG. 6) and a host controller (for example, host controller 120 of FIG. 6); and a storage device (for example, storage device 200 of FIG. 6), wherein the host controller is configured to perform the method for accessing the data in the host memory as described herein.

Figure 7:
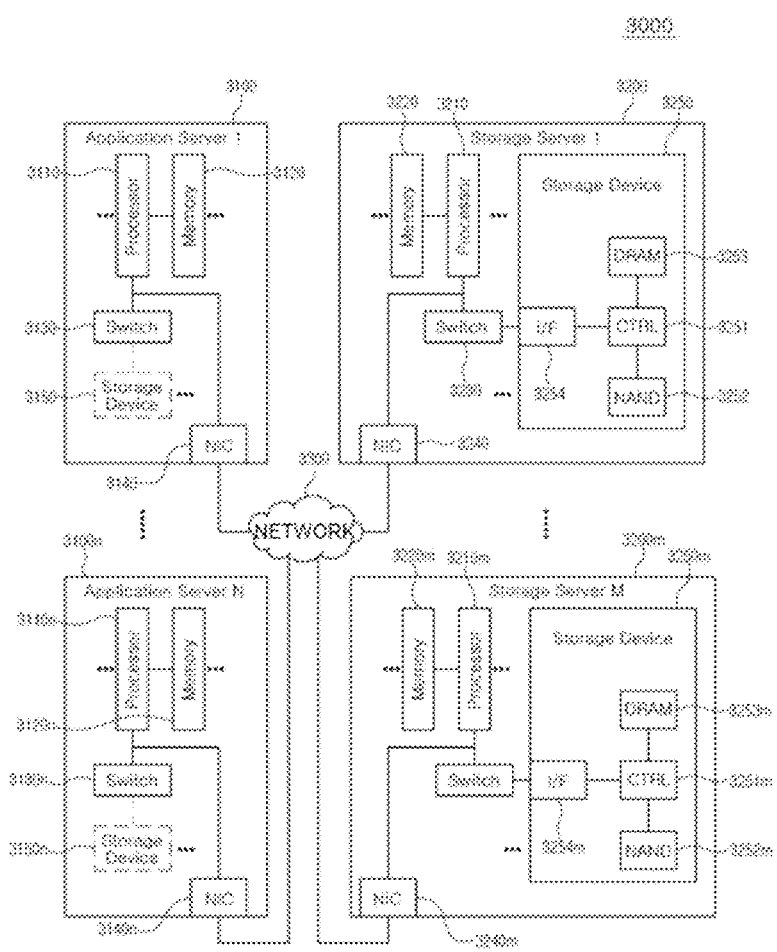
FIG. 7 is a schematic diagram of a data center to which storage devices are applied according to some example embodiments.

FIG. 7 is a diagram of a data center 3000 to which a storage device is applied, according to some example embodiments.

Referring to FIG. 7, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100$n$ and storage servers 3200 to 3200$m$. The number of application servers 3100 to 3100$n$ and the number of storage servers 3200 to 3200$m$ may be variously selected according to embodiments. The number of application servers 3100 to 3100$n$ may be different from the number of storage servers 3200 to 3200$m$.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be or may include, or be included in, one or more of a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In some example embodiments, the processor 3210 and the memory 3220 may provide a processor-memory pair. In some example embodiments, the number of processors 3210 may be different from (e.g., greater than or less than) the number of memories 3220. The processor 3210 may include a single-core processor or a multi-core processor. The above description of the storage server 3200 may be similarly applied to the application server 3100. In some example embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100$n$ may communicate with the storage servers 3200 to 3200$m$ through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200$m$ may be provided as file storages, block storages, or object storages according to an access method of the network 3300.

In some example embodiments, the network 3300 may be or include or be included in a storage-dedicated network, such as a storage area network (SAN). For example, the SAN may be an FC-SAN, which uses an FC network and is implemented according to an FC protocol (FCP). Alternatively or additionally, the SAN may be or include or be included in an Internet protocol (IP)-SAN, which uses a transmission control protocol (TCP)/IP network and is implemented according to a SCSI over TCP/IP or Internet SCSI (iSCSI) protocol. In some example embodiments, the network 3300 may be a or include or be included in general network, such as a TCP/IP network. For example, the network 3300 may be implemented according to a protocol, such as one or more of FC over Ethernet (FCOE), network attached storage (NAS), and NVMe over Fabrics (NVMe-oF).

Hereinafter, the application server 3100 and the storage server 3200 will mainly be described. A description of the application server 3100 may be applied to another application server 3100$n$, and a description of the storage server 3200 may be applied to another storage server 3200$m$.

The application server 3100 may store data, which is requested by a user or a client to be stored, in one of the storage servers 3200 to 3200$m$ through the network 3300. Also, the application server 3100 may obtain data, which is requested by the user or the client to be read, from one of the storage servers 3200 to 3200$m$ through the network 3300. For example, the application server 3100 may be implemented as a web server or a database management system (DBMS).

The application server 3100 may access a memory 3120$n$ and/or a storage device 3150$n$, which is included in another application server 3100$n$, through the network 3300. Alternatively or additionally, the application server 3100 may access memories 3220 to 3220$m$ or storage devices 3250 to 3250$m$, which are included in the storage servers 3200 to 3200$m$, through the network 3300. Thus, the application server 3100 may perform various operations on data stored in application servers 3100 to 3100$n$ and/or the storage servers 3200 to 3200$m$. For example, the application server 3100 may execute an instruction for moving or copying data between the application servers 3100 to 3100$n$ and/or the storage servers 3200 to 3200$m$. In this case, the data may be moved from the storage devices 3250 to 3250$m$ of the storage servers 3200 to 3200$m$ to the memories 3120 to 3120$n$ of the application servers 3100 to 3100$n$ directly or through the memories 3220 to 3220$m$ of the storage servers 3200 to 3200$m$. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as one or more of ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In some example embodiments, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230, and the storage device 3250.

In the storage servers 3200 to 3200$m$ or the application servers 3100 to 3100$n$, a processor may transmit a command to storage devices 3150 to 3150$n$ and 3250 to 3250$m$ or the memories 3120 to 3120$n$ and 3220 to 3220$m$ and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In some example embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

According to various example embodiments, a data center system (for example, data center 3000) is provided, including: a plurality of application servers (for example, application servers 3100-3100n); and a plurality of storage servers (for example, storage servers 3200-3200m), wherein each of the plurality of application servers and/or each of the plurality of storage servers is configured to perform the method for accessing the data in the host memory as described herein.

According to various example embodiments, there may be provided a computer-readable storage medium storing instructions, when executed by at least one processor, causing the at least one processor to perform the method for accessing the data in the host memory according to the present disclosure. Examples of computer-readable storage media here include one or more of read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in some examples, the computer program and any associated data, data files and data structures are distributed on networked computer systems, so that computer programs and any associated data, data files, and data structures are stored, accessed, and executed in a distributed manner through one or more processors or computers.

According to some example embodiments, there may be provided a computer program product, wherein instructions in the computer program product may be executed by a processor of a computer device to implement the method for accessing the data in the host memory described herein.

Any or all of the elements described with reference to various figures may communicate with any or all other elements described with reference to the respective figures. For example, any element may engage in one-way and/or two-way and/or broadcast communication with any or all other elements, to transfer and/or exchange and/or receive information such as but not limited to data and/or commands, in a manner such as but not limited to being in a serial and/or parallel manner, via a bus such as a wireless and/or a wired bus (not illustrated). The information may be in encoded various formats, such as in an analog format and/or in a digital format.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Those of ordinary skill in the art may think of other example embodiments after considering the specification and practicing the disclosure disclosed herein. Example embodiments are intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the embodiments are to be regarded as examples only, and the actual scope and spirit are pointed out by the following claims. Furthermore, example embodiments are not necessarily mutually exclusive with one another. For example, some example embodiments may include one or more features described with reference to one or more figures, and may also include one or more other features described with reference to one or more other figures.

What is claimed is:

1. A method for accessing data in a host memory, comprising:

in response to writing first data corresponding to a first Remote Dictionary Server (Redis) instance of a plurality of Redis instances into the host memory, determining whether a remaining host memory capacity for the first Redis instance is sufficient to store the first data, wherein the remaining host memory capacity is based on a difference between maximum capacity of the host memory that is capable of being used by the first Redis instance and capacity of the host memory that has been used by the first Redis instance; and in response to the remaining host memory capacity not being sufficient to store the first data, evicting second data of the first Redis instance from the host memory to a Computing Express Link (CXL) device and storing the first data in the host memory, wherein the evicting of the second data of the first Redis instance from the host memory to the CXL device comprises:

storing Key-Value (K (V) information corresponding to the second data in a CXL device dictionary (DICT) that corresponds to the first Redis instance; and deleting the KV information corresponding to the second data from the host memory corresponding to the first Redis instance.

2. The method of claim 1, further comprising:
in response to reading third data corresponding to the first Redis instance and in response to the third data not being hit in the host memory, reading the third data from the CXL device.

3. The method of claim 2, wherein the evicting of the second data of the first Redis instance from the host memory to the CXL device comprises:
requesting requested storage space from the CXL device; storing the second data in the requested storage space; and deleting the second data from the host memory.

4. The method of claim 1, further comprising:
determining whether remaining storage capacity of the CXL device is less than a first threshold; and
deleting a part of data in the CXL device such that the remaining storage capacity of the CXL device is not less than the first threshold, in response to determining that the remaining storage capacity of the CXL device is less than the first threshold.

5. The method of claim 4, wherein the deleting of the part of the data in the CXL device comprises:
deleting data that has been stored for a period of time that is longer than a first length of time in storage space of the CXL device such that the remaining storage capacity of the CXL device is greater than a second threshold;
deleting Key-Value (KV) information of the data that has been stored for the period of time in a CXL device dictionary (DICT) corresponding to the first Redis instance; and
updating information on the remaining storage capacity of the CXL device.

6. The method of claim 1, wherein the CXL device is shared by the plurality of Redis instances.

7. The method of claim 1, wherein the second data is data whose heat satisfies a condition of the first Redis instance in the host memory.

8. The method of claim 7, wherein the data whose heat satisfies the condition indicates data whose storage duration exceeds a duration.

9. An electronic device comprising:
a memory configured to store one or more instructions;
a plurality of storage devices; and
a host processor configured to execute the one or more instructions to cause the host processor to perform the method for accessing the data in the host memory of claim 1.

10. A host storage system comprising:
a host, comprising a host memory and a host controller; and
a storage device,
wherein the host controller is configured to perform the method for accessing the data in the host memory of claim 1.

11. A data center system comprising:
a plurality of application servers; and
a plurality of storage servers,
wherein each of the plurality of application servers and/or each of the plurality of storage servers is configured to perform the method for accessing the data in the host memory of claim 1.

12. A non-transitory computer readable storage medium storing a computer program that when executed by a processor causes the processor to implement the method for accessing the data in the host memory of claim 1.

13. A device for accessing data in a host memory, comprising:
a first determining unit configured to determine whether remaining host memory capacity of a first Remote Dictionary Server (Redis) instance of a plurality of Redis instances is sufficient to store first data in response to writing the first data corresponding to the first Redis instance into the host memory, wherein the remaining host memory capacity is based on a difference between maximum capacity of the host memory that is capable of being used by the first Redis instance and capacity of the host memory that has been used by the first Redis instance; and
an evicting and storing unit configured to evict second data of the first Redis instance from the host memory to a Computing Express Link (CXL) device and store the first data in the host memory in response to the remaining host memory capacity not being sufficient to store the first data,
wherein the evicting and storing unit is configured to:
store Key-Value (KV) information corresponding to the second data in a CXL device dictionary corresponding to the first Redis instance; and
delete the KV information corresponding to the second data from the host memory corresponding to the first Redis instance.

14. The device of claim 13, wherein the device further comprises:
a reading unit configured to read third data from the CXL device in response to the third data not being hit in the host memory and in response to reading the third data corresponding to the first Redis instance.

15. The device of claim 14, wherein the evicting and storing unit is configured to:
request storage space from the CXL device;
store the second data in the requested storage space; and
delete the second data from the host memory.

16. The device of claim 13, further comprising:
a second determining unit configured to determine whether remaining storage capacity of the CXL device is less than a first threshold; and
a deleting unit configured to delete a part of data in the CXL device such that the remaining storage capacity of the CXL device is not less than the first threshold in response to determining that the remaining storage capacity of the CXL device is less than the first threshold.

17. The device of claim 16, wherein the deleting unit is configured to:
- delete data in storage space of the CXL device that has been stored for a period of time that is longer than a first length of time such that the remaining storage capacity of the CXL device is greater than a second threshold;
- delete Key-Value (KV) information of the data that has been stored for the period of time in the CXL device dictionary (DICT) corresponding to the first Redis instance; and
- update information on the remaining storage capacity of the CXL device.

18. The device of claim 13, wherein the CXL device is shared by the plurality of Redis instances.

19. The device of claim 13, wherein the second data is data whose heat meets a condition of the first Redis instance in the host memory.

20. The device of claim 19, wherein the data whose heat satisfies the condition indicates data whose storage duration exceeds a duration.

\* \* \* \* \*